United States Patent [19]

McCord

[11] Patent Number: 4,630,648
[45] Date of Patent: Dec. 23, 1986

[54] DECK DRAIN BY-PASS PLUG

[76] Inventor: Herbert E. McCord, 28306 NE. 112th, Battleground, Wash. 98604

[21] Appl. No.: 689,225

[22] Filed: Jan. 7, 1985

[51] Int. Cl.⁴ ............................................. F16L 55/07
[52] U.S. Cl. .................................. 138/103; 114/197; 141/392; 285/97
[58] Field of Search ............... 141/312, 287, 372, 392; 277/34, 34.3; 285/97, 107, 109; 138/103, 178, 90, 93; 114/221 R, 179, 197

[56] References Cited

U.S. PATENT DOCUMENTS

| | | | |
|---|---|---|---|
| 2,178,494 | 10/1939 | Richardson | 141/312 |
| 3,190,679 | 5/1963 | Lester | 285/8 |
| 4,216,981 | 8/1980 | Jensen | 285/97 |
| 4,342,336 | 8/1982 | Satterthwaite et al. | 138/90 |
| 4,469,152 | 9/1984 | Hardee et al. | 141/312 |

FOREIGN PATENT DOCUMENTS 1170921  11/1969  United Kingdom .

OTHER PUBLICATIONS

Cherne Industries, Inc., Product Data Sheet "Muni-Ball Brand Pneumatic Sewer Plugs", two pages, Nov. 1983.
Cherne Industries, Inc., price list for "Muni-Ball Brand Pneumatic Plugs", Dec. 1981.
Cherne Industries, Inc., booklet "Safety is No Accident", 25 pages, 1979.

*Primary Examiner*—Houston S. Bell, Jr.
*Attorney, Agent, or Firm*—Klarquist, Sparkman, Campbell, Leigh & Whinston

[57] ABSTRACT

An apparatus insertable into a ship deck drain for draining water from such drain includes a conduit having an outlet end and threaded inlet end, substantially tubular inflatable sleeve surrounding a portion of the conduit insertable into the drain, and a pair of collars for supporting opposite ends of the sleeve. One of the collars is threaded onto the threaded end portion of the conduit, while the other collar is attached to an intermediate portion of the sleeve portion. In various embodiments of the apparatus the sleeve takes different forms. In one embodiment, the sleeve is an enclosed, double-walled tubular bladder. The sleeve is inflated for radial expansion via a valve and valve stem in fluid communication with an airtight chamber formed by the sleeve. In one embodiment, the valve stem extends axially within the bore of the conduit, exiting the outlet end of the conduit and terminating at the valve.

10 Claims, 6 Drawing Figures

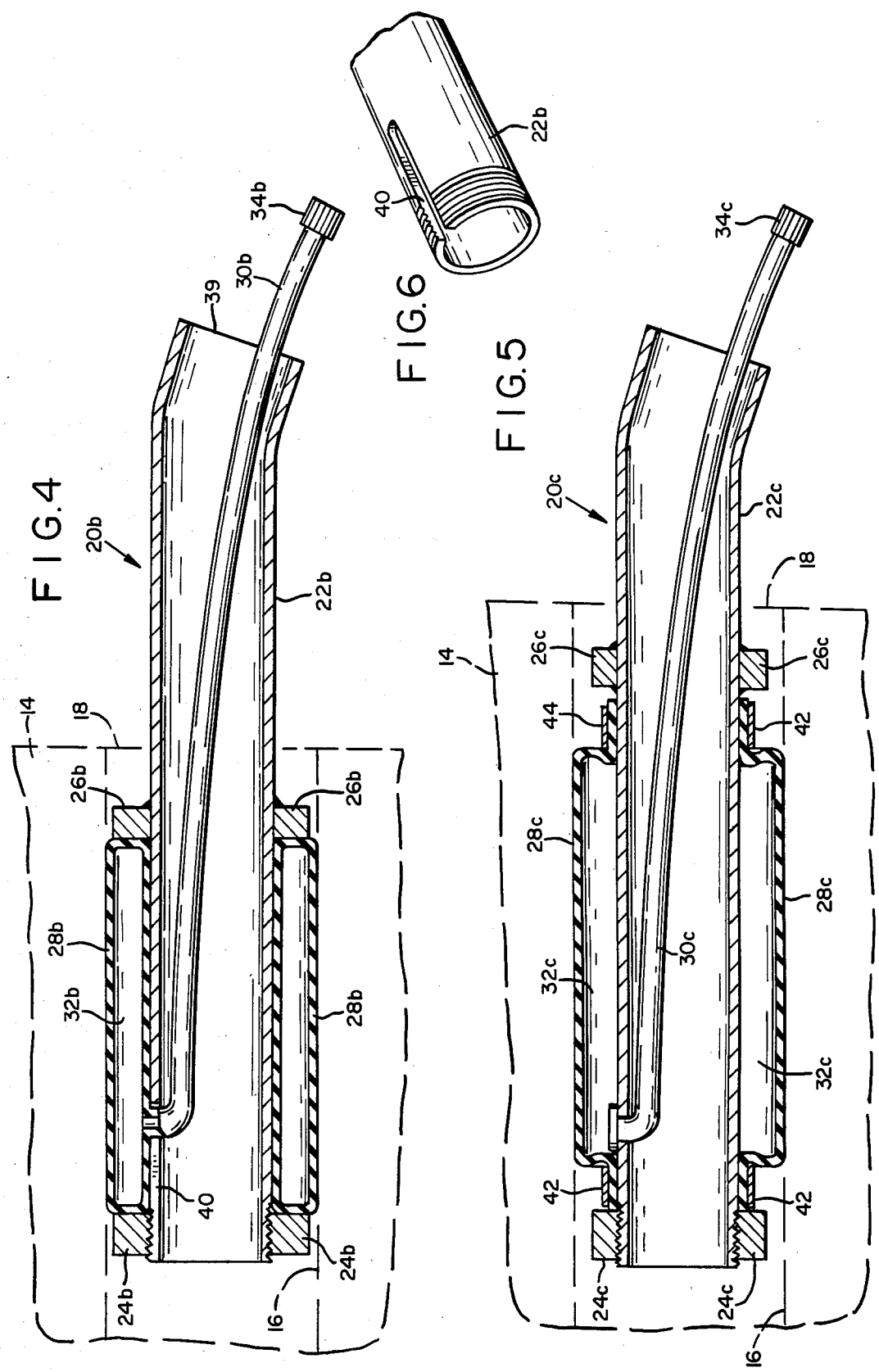

DECK DRAIN BY-PASS PLUG

BACKGROUND OF THE INVENTION

This invention relates generally to ship repair apparatus and more particularly to apparatus used in conjunction with a ship drain to facilitate the repair of a ship's hull.

Ship decks are usually provided with numerous drains, commonly referred to as "scupper holes", which terminate at drain openings in the ship's hull, located above the water line. The drains extend generally downwardly from the deck and then generally horizontally toward the vertical outer surface of the hull where they terminate. The drains permit rain and sea water collecting on the deck to drain from the deck's surface. The drains also permit the deck to be easily cleaned with a high pressure water hose by draining the wash water from the deck's surface.

However, such drains or scupper holes create problems when the ship is in drydock to have its hull repaired or refurbished. Rain water or wash water which collects on the deck drains through the scupper holes and then flows down the outer surface of the ship's hull, making it difficult if not impossible for work to be done on the hull. For example, the draining water, together with the grit and grime it carries, can ruin the finish of a freshly painted hull or make it difficult to sand the hull.

Unsuccessful attempts have been made to solve this problem. For example, plugs have been inserted into the drain openings to plug the drains. Such plugs have proved unsatisfactory because water accumulates in the drain and eventually backs up onto the deck, creating an unsafe condition and making it difficult to do any work on the deck. Also, such plugs inherently leak, even when wrapped with rags, and hence still do not solve the drainage problem. Some success has been had with a modified plug having an axially extending bore and a pipe inserted into such bore to permit water in the drain to be conveyed away from the hull's outer surface. Although the modifed plug alleviates the water accumulation problem, it still permits water to leak from the drain and interfere with the work being done to the hull.

Another attempt at solving the aforementioned problem involves tack welding a metal trough-like member to the hull just beneath each drain opening. This method is time consuming and costly in that it requires one or more welders to tack weld many (more than fifty in some cases) troughs to the sides of the ship. Even without full welds, the work required to install and remove the numerous troughs is considerable. Further, the troughs still do not solve the leakage problem because they provide an ineffective seal at the drain opening, permitting water at the welded joint to leak down the hull's outer surface.

Accordingly, there remains a need for a ship deck drain apparatus which can be quickly and easily installed and removed with a minimal amount of labor, eliminates the leakage of water from the drain down the side of the ship, and keeps water from accumulating in the drain.

SUMMARY OF THE INVENTION

It is an therefore an object of the present invention to provide an apparatus that prevents water from accumulating in a ship drain and at the same time eliminates the leakage of water from the drain down the side of the ship.

Another object of the present invention is to provide an apparatus as aforesaid that is quickly and easily installed and removed with a minimal amount of labor.

Yet another object of the present invention is to provide an apparatus as aforesaid which is operable whether inserted near the drain opening or well inside the drain.

Still another object of the invention is to provide an apparatus as aforesaid that does not permit water to collect in the drain and back up onto the deck of the ship.

In accordance with the foregoing objects, the present invention is a by-pass plug particularly well-suited for use with a ship deck drain having a bore wall which terminates at a drain opening in an exterior surface of the ship's hull. The plug includes a conduit means having a first portion insertable coaxially into the deck drain and a second portion extending away from the deck drain and hull. It further includes inflatable sleeve means surrounding and in coaxial relationship with the first portion and sleeve inflating means for inflating the sleeve means under pressure such that the sleeve means expands to contact the bore wall to provide a fluid-proof barrier between the conduit means and bore wall. Both ends of the sleeve means are supported by a collar means preferably including a pair of collars extending radially from an outer surface of the conduit means. One collar is located proximate an inlet end of the conduit means. Such collar is preferably mounted to the inlet end by threaded engagement. The other collar is located closer to the midsection of the conduit means than the first collar.

In one form of the invention, the conduit means is provided with a slotted end portion. The sleeve means includes a self-contained, double-walled sleeve connected to the sleeve inflating means which extends through the slotted portion and axially along a portion of the bore of the conduit means.

In another form, the sleeve inflating means includes opposite end portions which are sealingly clamped circumferentially against the conduit means by a clamping means. In this configuration, a portion of the conduit means partially defines an airtight chamber to facilitate inflating the sleeve means.

In yet another form, the sleeve inflating means takes the form of a tubeless tire.

The foregoing and other objects, features and advantages of the invention will become more readily apparent from the following detailed description which proceeds with reference to the accompanying drawings.

BRIEF DESCRIPTION OF THE DRAWINGS

FIGS. 3, 4 and 5 are views similar to FIG. 2 showing other embodiments of the present invention.

FIG. 6 is a perspective view of a conduit of the embodiment of FIG. 4.

DETAILED DESCRIPTION OF THE DRAWINGS

Figure 1:
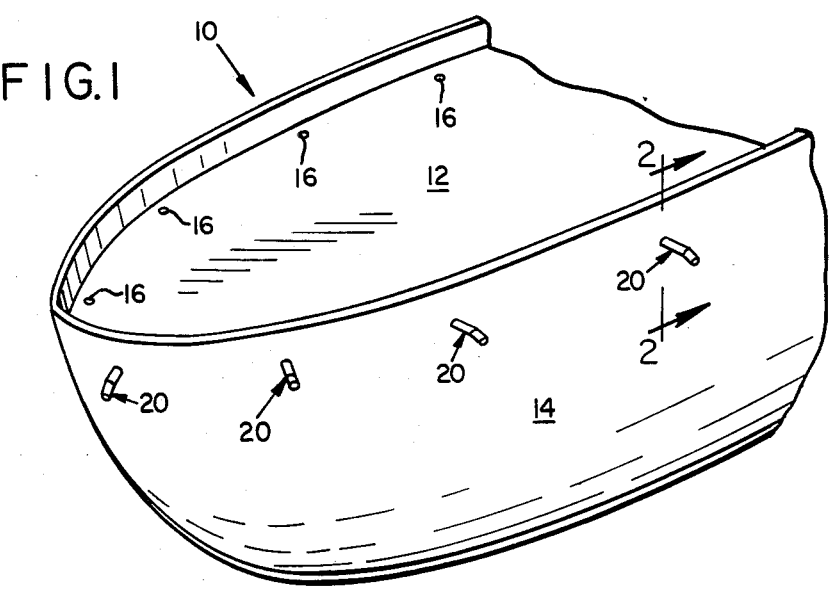
FIG. 1 is a perspective view showing the ship's deck, hull, and scupper holes with the present invention inserted therein.

Referring to FIG. 1, a ship 10 has a deck 12 and hull 14. Deck 12 is provided with a plurality of "scupper holes" or drains 16 spaced about its periphery (near the gunnel) to drain away any surface water. Each drain 16 extends generally downwardly from the deck, undergoes roughly a ninety degree bend and then extends outwardly through the hull, terminating at a drain opening 18 (FIGS. 2-5) in the hull's outer surface. The present invention, designated generally by the reference numeral 20, is a pneumatic by-pass plug insertable into the scupper hole at opening 18.

Figure 2:
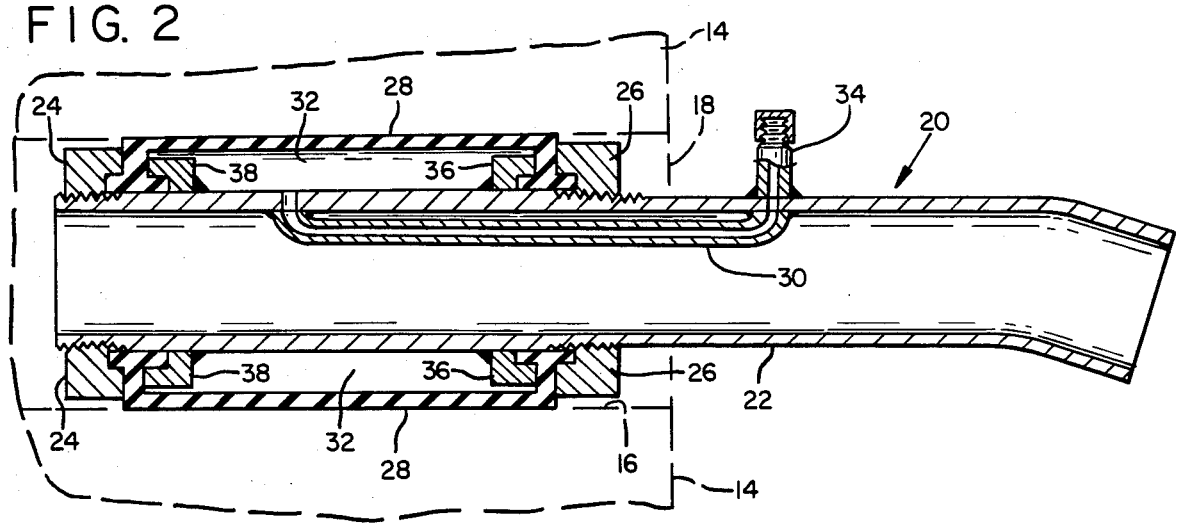
FIG. 2 is a cross-sectional view taken along line 2—2 of FIG. 1, showing one embodiment of the present invention installed in a scupper hole.

Embodiment of FIG. 2

Referring to FIG. 2, by-pass plug 20 includes a conduit 22, collars 24, 26, inflatable sleeve 28, valve stem 30 and valve 34. Conduit 22 is provided with a pair of axially spaced, circumferential "L" shaped flanges 36, 38. The flanges are secured, preferably by welding, to the outer surface of the conduit, with flange 38 located near the inlet end of the conduit and flange 36 located between flange 38 and the conduit's outlet end. The conduit's outer surface is threaded adjacent both flanges to threadably mount both collars 24, 26. Thus, an inlet end portion of the conduit's outer surface is threaded to receive collar 24, and a portion of such outer surface just downstream of flange 36 is threaded to receive collar 26. Like flanges 36, 38, collars 24, 26 each have "L" shaped cross sections.

Inflatable sleeve 28, made from a resilient, stretchable material such as rubber, is a generally tubular member having radially extending "T" shaped end portions or end walls. Such end portions matingly engage flanges 36, 38, as shown in FIG. 2. Collars 24, 26, which have polygonal outer surfaces for engagement by a wrench, are tightened to compress the "T" shaped end portions against their respective flanges 36, 38, such that each sleeve end portion fits together in nested relationship with its respective flange and collar. In this way, an airtight chamber 32 is created between the sleeve and conduit, which is fluid communication with stem 30 and valve 34 to permit the sleeve to be inflated under pressure. Stem 30 is preferably welded or otherwise secured to the inner surface of the conduit such that one end of the stem is aligned with an opening in the conduit communicating with chamber 32 and the other end of the stem is aligned with an opening in the conduit communicating with valve 34. Valve 34 is secured to a portion of the conduit's outer surface external to the scupper hole so that it is accessible.

When inflated, the sleeve sealingly engages the scupper hole to prevent any water from passing between the conduit and drain wall and hence from leaking out through opening 18. Conduit 22 is made long enough such that any water in the scupper hole is conveyed by gravity through opening 18 and away from hull 14 a sufficient distance so as not to wet the hull when it drains.

Collar 26 can be loosened on the conduit, and collar 24 removed therefrom altogether, so as to permit the sleeve to be repaired or replaced by sliding the sleeve off the end of the conduit.

The primary difference between each of the embodiments of the present invention resides in the type of inflatable sleeve employed. Like parts of the different embodiments are distinguished by the letters "a", "b", "c".

Figure 3:
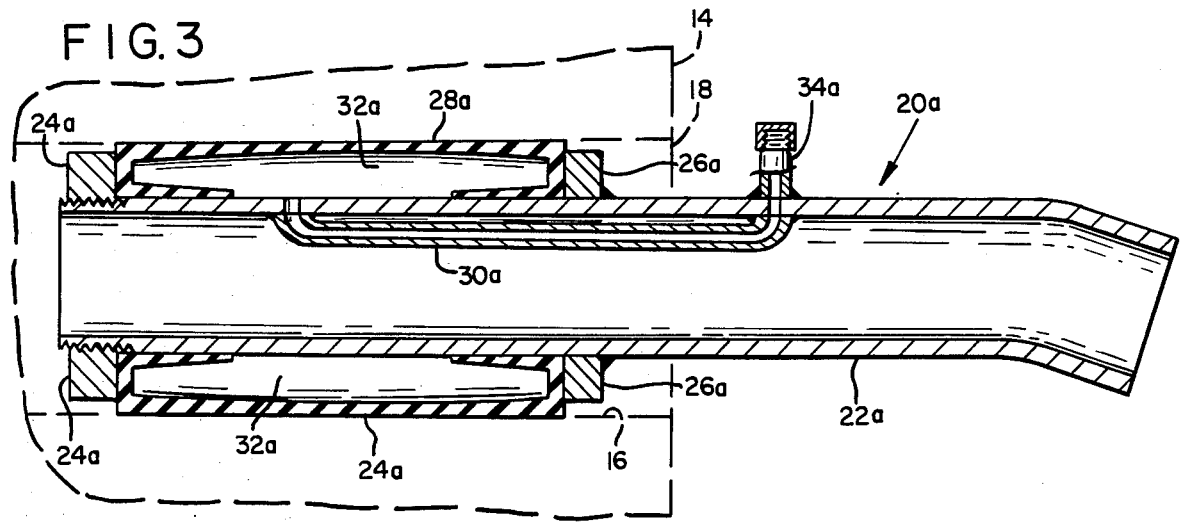

Embodiment of FIG. 3

Referring to FIG. 3, by-pass plug 20a includes a "tubeless tire" type inflatable sleeve 28a stabilized at its ends on conduit 22a by collars 24a and 26a. Although collar 24a is threadably mounted on the inlet end portion of conduit 22a, like collar 24 of FIG. 2, collar 26a can be rigidly secured, such as by welding, to the conduit since it is unnecessary to "loosen" collar 26a to permit removal of the sleeve from the conduit. Unlike collars 24, 26, collars 24a, 24b can be shaped like conventional "nuts", since the end walls of sleeve 28a are flat and a nesting relationship is not required to form an airtight chamber. The sleeve is inflated using stem 30a and valve 34a in the manner earlier described.

Upon inflation, the end walls of sleeve 28a are compressed against collars 24a and 26a, creating an airtight chamber 32a and causing sleeve 28a to expand radially outwardly into sealing contact with the bore wall of drain 16. Even without inflation, the sleeve may be expanded radially somewhat by tightening collar 24a on the conduit to compress the sleeve between the two collars. The expanded sleeve seals the drain against any drainage through opening 18. Conduit 22a is made long enough such that any water in the scupper hole is carried away from opening 18 a distance sufficient so as not to wet the hull when it drains.

Embodiment of FIG. 4

Referring to FIG. 4, by-pass plug 20b includes a double-walled, self-contained inflatable sleeve 28b, resilient hose or valve stem 30b extending along the bore of conduit 22b and exiting the conduit at an outlet 39, and valve 34b. Unlike the embodiments of FIGS. 2 and 3, airtight chamber 32b is defined wholly by the sleeve and not in part by the outer surface of the conduit. As with the embodiment of FIG. 3, collar 24b is threadably mounted on the conduit and collar 26b is preferably welded thereto.

Unlike the prior embodiments, the inlet end of the conduit is slotted at 40, as shown in FIG. 6, to permit the sleeve, elongate valve stem, and valve to be slid as a unit off the inlet end of the conduit to permit any of such parts to be repaired or replaced. This feature makes it easier to repair leaks along the valve stem and where such stem joins the sleeve and valve. This feature can easily be incorporated into the other embodiments.

Embodiment of FIG. 5

Referring to FIG. 5, by-pass plug 20c includes a tubular inflatable sleeve 28c having opposite end portions strapped to the outer surface of conduit 20c by straps or clamping members 42 and 44. As with the embodiment of FIG. 4, the sleeve is inflated through an elongate valve stem 30c extending most of the length of the bore of the conduit, and exiting the outlet end of the conduit. The sleeve may be removed from the conduit by removing collar 24c, releasing straps 42, 44 and sliding the sleeve off the inlet end of the conduit.

Operation and Installation

In operation, one by-pass plug is inserted into each drain opening in the hull and inflated, preferably to a pressure of about 60-90 psi. The inflated sleeve seals against water draining through the drain opening and then down the exterior surface of the hull. The conduit is long enough such that any water in the scupper hole is permitted to drain to the ground away from the hull of the ship. The plug creates a firm, elongate seal between the outer wall of the conduit and bore wall of the scupper hole, thereby to prevent any leakage at the interface between these two members. It does not have to be welded or otherwise semi-permanently secured to the ship. Thus, the present invention overcomes the problems of the prior art in that it is easy to install and remove, does not permit water to collect in the scupper hole, and effectively prevents any water from draining down the hull's outer surface to interfere with work being done to such surface.

Another important advantage of the invention is that the inflatable sleeve, which is preferably made of a highly elastomeric rubber, such as that used in making inner tubes, is capable of expanding to a size much greater than the diameters of the collars and conduit. This permits a standard size plug to be used with a wide range of different size scupper holes. For example, a by-pass plug having a diameter of 2 inches at the collars can be used with scupper holes having a diameter within the range of about 2⅛ inch to 4–5 inches.

The sleeve preferably has a thickness of about 3/16–¼ inch to withstand considerable wear and tear. When deflated, the sleeve's diameter is generally slightly less than that of the collars'.

Alternate Uses

Any of the foregoing embodiments can also be used to temporarily repair ship pipes which rupture while the ship is at sea. Previously, when such rupture occurred, the particular system had to be shut down until the ship had returned to port where the ruptured pipe could be repaired. By removing or cutting away the damaged portion of the pipe, by-pass plugs can be inserted into both openings of the severed pipe sections, inflated, and the inflated plugs interconnected by a sturdy hose to permit fluid to flow from one severed pipe section to the other without leakage at the severed joints.

To this end, the outlet end of the plug's conduit can be provided with integral male and/or female fittings to facilitate the connection of a mating female/male hose or pipe fitting. Obviously, such feature can be applied to the embodiments of FIGS. 2–5 to, for example, permit pipe or hose extensions to be easily coupled to the outlet end of the plug's conduit.

The aforementioned by-pass plug can also be used with an internally inflated bladder to pressure test pipes. To do so, two plugs are inserted into opposite ends of the pipe and inflated. A bladder, either insertable into one end of the plug's conduit or made an integral part of the plug by being secured within the bore of the conduit, is inflated in both plugs to completely seal off the outlet ends of such plugs. With both the external sleeve and internal bladder of both plugs inflated, the pipe is provided with an airtight central chamber. Pressurized air is then introduced into such control chamber through a valve in one of the plugs.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. For use with a ship deck drain having a bore wall which terminates at a drain opening in an exterior surface of the ship's hull, an apparatus to drain any fluid accumulating in the ship deck so as to facilitate the repair of such surface comprising:
   conduit means having a first portion with an inlet end insertable coaxially into said ship deck drain and a second portion with an outlet end extending away from said ship deck drain and hull, said conduit means defining a bore through which fluid is permitted to flow by gravity away from said ship drain opening and hull to drain;
   inflatable sleeve means surrounding and in coaxial relationship with said first portion of said conduit means;
   sleeve inflating means for inflating said sleeve means under pressure such that said sleeve means expands to contact said ship bore wall to provide a fluid-proof barrier between said conduit means and ship bore wall, whereby fluid in said deck drain is permitted to drain only through said conduit means away from the hull and not down the ship's exterior surface; and
   collar means extending radially from an outer surface of said conduit means to support opposite ends of said sleeve means;
   said collar means including a first collar for supporting the end of said sleeve means closest to said inlet end and a second collar for supporting the other end of said sleeve means, said conduit means and first collar being threaded such that said first collar is threadably mounted on said conduit means, whereby said first collar is detachable from said conduit means.

2. The apparatus of claim 1 wherein said sleeve means has first and second ends, and further including clamping means for clamping said first and second ends against an outer surface of said conduit means.

3. The apparatus of claim 1 wherein said sleeve inflating means includes stem means extending axially along a portion of said bore and terminating at one end at an opening in said conduit means proximate to said sleeve means and at its other end at another opening in said conduit means in fluid communication with a valve means external to said conduit means.

4. The apparatus of claim 1 wherein said sleeve means includes an endless tubular outer wall portion, opposite end wall portions, and inner wall portion formed by a pair of separated tubular portions extending from said end walls centrally toward but terminating short of each other.

5. The apparatus of claim 4 wherein said first collar is threadably mounted on the inlet end of said conduit means, said sleeve inflating means including stem means extending axially within the bore of said conduit means, said stem means terminating at one end at an opening in said conduit means in fluid communication with an enclosed chamber defined by said sleeve means and at the other end at another opening in said conduit means in fluid communication with a valve means secured to said outer surface of said conduit means.

6. The apparatus of claim 1 wherein said sleeve means includes a substantially tubular double-walled sleeve.

7. The apparatus of claim 1 wherein said inflating means includes stem means extending axially within said conduit means, said stem means terminating at a first end at a valve means external to said conduit means and at an opposite second end at an opening in said conduit means proximate said sleeve means.

8. The apparatus of claim 7 wherein said conduit means has a slotted end portion, said stem means exiting said conduit means at its outlet end, said collar means including a collar, whereby said collar can be detached from said conduit means and said sleeve, stem means and valve means removed as a unit from said conduit means.

9. For use with a ship deck drain having a bore wall which terminates at a drain opening in an exterior surface of the ship's hull, an apparatus to drain any fluid accumulating in the ship deck so as to facilitate the repair of such surface comprising:

conduit means having a first portion with an inlet end insertable coaxially into said ship deck drain and a second portion with an outlet end extending away from said ship drain and hull, said conduit means defining a bore through which fluid is permitted to flow by gravity away from said ship drain opening and hull to drain;

inflatable sleeve means surrounding and in coaxial relationship with said first portion of said conduit means; and sleeve inflating means for inflating said sleeve means under pressure such that said sleeve means expands to contact said ship bore wall to provide a fluid-proof barrier between said conduit means and ship bore wall, whereby fluid in said deck drain is permitted to drain only through said conduit means away from the hull and not down the ship's exterior surface;

said sleeve means having opposite sleeve ends;

flange means extending radially outwardly from an outer surface of said conduit means in proximate relationship to each said sleeve end; and clamping means for clamping each said sleeve end against its respective flange means;

said clamping means including a first collar for engaging said sleeve end closest to said inlet end and a second collar for engaging the other sleeve end, each said collar, flange means and sleeve end being sized and shaped to fit together in nested relationship when said sleeve ends are clamped between their respective collars and flange means.

10. The apparatus of claim 9 wherein said conduit means has externally threaded portions for threadably mounting said first and second collars to permit at least said first collar to be detached from said conduit means.

* * * * *